US009910290B2

(12) United States Patent
Dong et al.

(10) Patent No.: US 9,910,290 B2
(45) Date of Patent: Mar. 6, 2018

(54) LENS DRIVING DEVICE FOR DETECTING POSITION OF A LENS MODULE

(71) Applicants: Leping Dong, Shenzhen (CN); Haibo Zhang, Shenzhen (CN)

(72) Inventors: Leping Dong, Shenzhen (CN); Haibo Zhang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/061,113

(22) Filed: Mar. 4, 2016

(65) Prior Publication Data
US 2017/0031173 A1 Feb. 2, 2017

(30) Foreign Application Priority Data
Jul. 31, 2015 (CN) .................... 2015 2 0572259 U

(51) Int. Cl.
G02B 27/64 (2006.01)
G02B 7/02 (2006.01)
G02B 7/08 (2006.01)

(52) U.S. Cl.
CPC ............ *G02B 27/646* (2013.01); *G02B 7/023* (2013.01); *G02B 7/08* (2013.01)

(58) Field of Classification Search
CPC .. G02B 27/64; G02B 27/646; H04N 5/23246; H04N 5/23264; H04N 5/2328; H04N 5/23287

USPC ....... 359/554, 557; 250/201.1, 201.2, 201.4; 348/208.99, 208.2, 208.12; 396/52, 55
See application file for complete search history.

(56) References Cited

U.S. PATENT DOCUMENTS

| | | | |
|---|---|---|---|
| 2013/0163085 A1* | 6/2013 | Lim .................. | H02K 41/0356 359/557 |
| 2016/0004091 A1* | 1/2016 | Lim .................. | H02K 41/0356 359/557 |
| 2016/0154204 A1* | 6/2016 | Lim ........................ | G02B 7/08 359/557 |
| 2016/0209671 A1* | 7/2016 | Hee ...................... | G02B 27/646 |
| 2016/0269644 A1* | 9/2016 | Cheong .............. | H04N 5/23287 |
| 2017/0038600 A1* | 2/2017 | Hee ...................... | G02B 27/646 |

* cited by examiner

*Primary Examiner* — Arnel C Lavarias
(74) *Attorney, Agent, or Firm* — Na Xu; IPro, PLLC

(57) ABSTRACT

A lens driving device, includes a shell providing an accommodating space, a supporting frame accommodated in the accommodating space, a lens module received in the supporting frame and comprising at least one lens and a lens holder for holding the at least one lens, a circuit board accommodated in the accommodating space and having at least two adjacent surfaces, each of the at least two adjacent surfaces having a position sensor and an anti-shake coil arranged thereon and apart from each other, a magnet assembly having at least two first magnets and at least two second magnets fixed to the supporting frame, each of the at least two second magnets abutting against a corresponding first magnet and be adjacent to a corresponding position sensor. Comparing to the relevant technologies, the lens driving device has good performance and high reliability.

6 Claims, 5 Drawing Sheets

LENS DRIVING DEVICE FOR DETECTING POSITION OF A LENS MODULE

FIELD OF THE DISCLOSURE

The present disclosure relates to camera lens technologies, and more particularly, to a lens driving device with anti-shake capability.

BACKGROUND

Cameras are widely applied in mobile devices, such as mobile phones, tablet computers or laptop computers, for recording images or videos. A camera generally includes a lens module and a lens driving device for driving the lens module to motion for focusing.

A related lens driving device includes an anti-shake coil and a position sensor for detecting a position of the lens module; the position sensor is located in a central hole of the anti-shake coil. However, the anti-shake coil generates an alternating magnetic field in operation, and a detecting accuracy of the position sensor may be impacted by the alternating magnetic field. This may deteriorate an anti-shake performance of the lens driving device.

Therefore, it is desired to provide a new lens driving device which can overcome the aforesaid problems.

BRIEF DESCRIPTION OF THE DRAWINGS

Many aspects of the embodiment can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
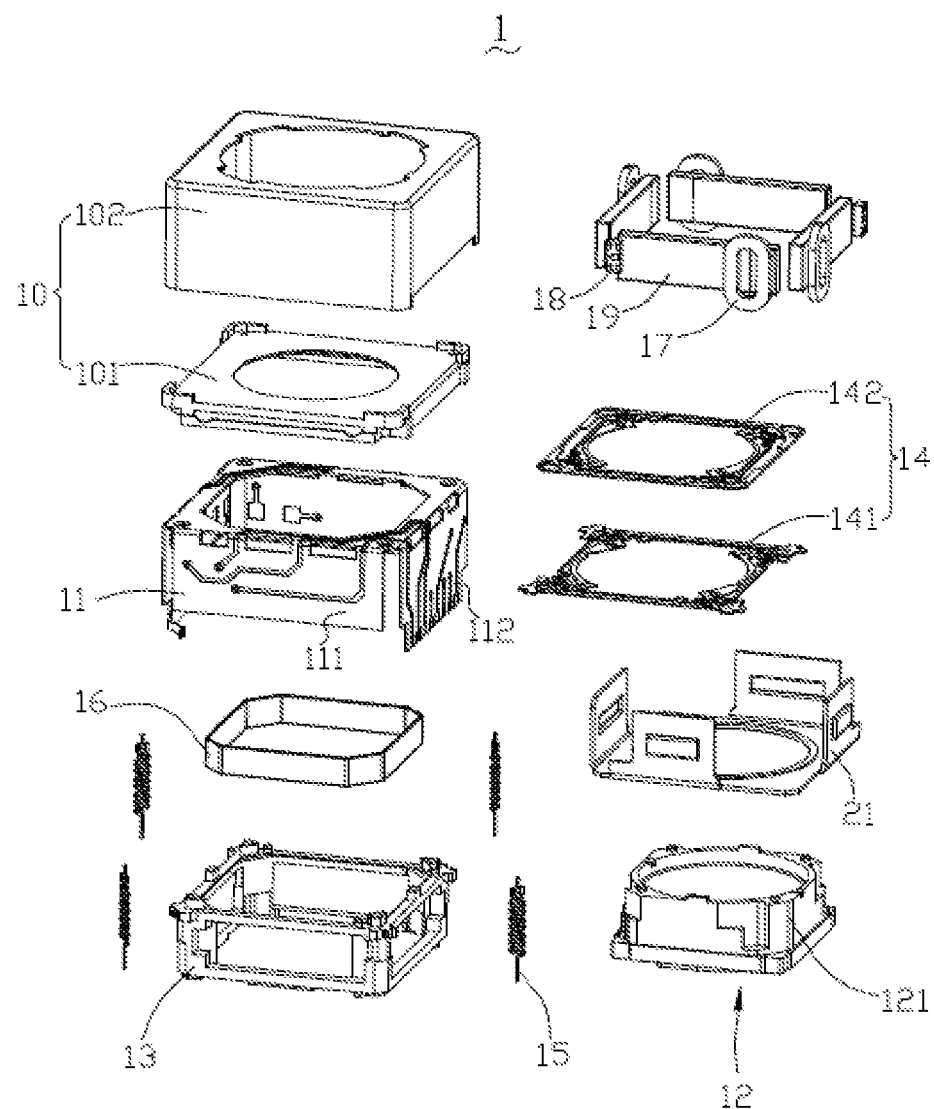
FIG. 1 is an exploded view of a lens driving device according to an embodiment of the present disclosure.
Figure 2:
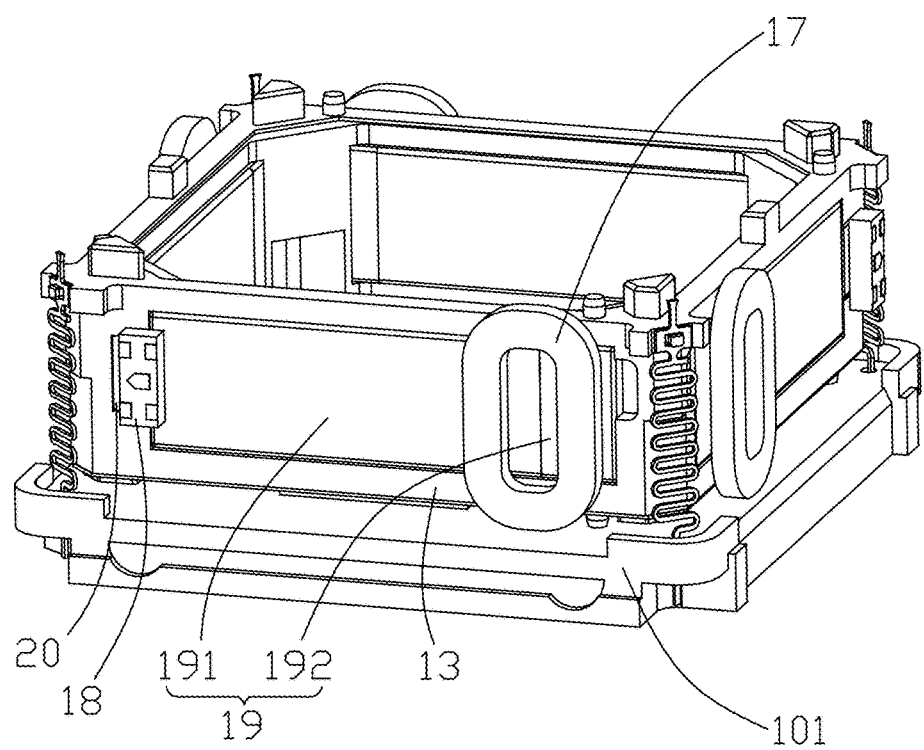
FIG. 2 is a partly assembled view of the lens driving device of FIG. 1.
Figure 3:
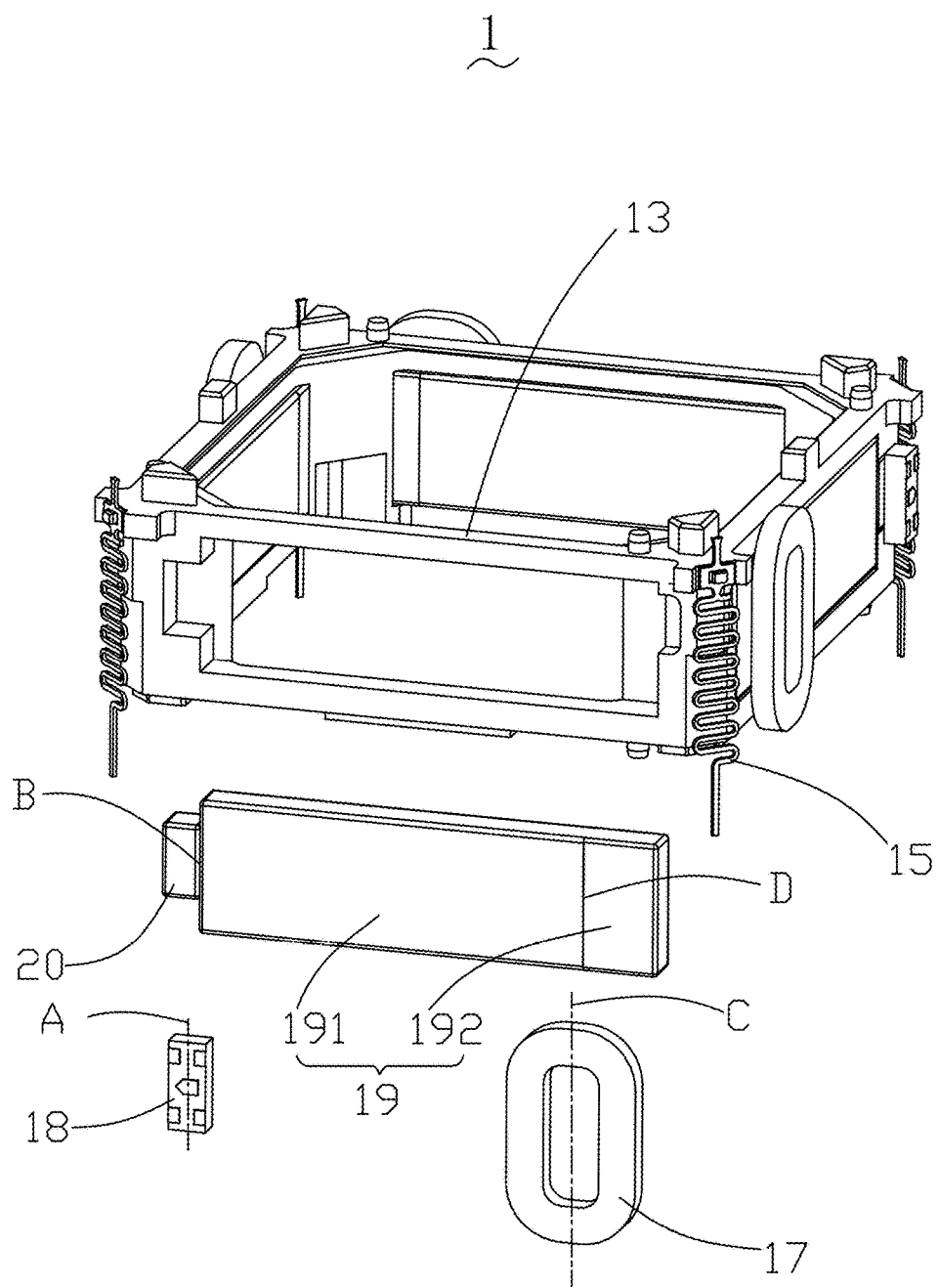
FIG. 3 is a partly exploded view of the lens driving device of FIG. 2.

The present disclosure will be described in detail below with reference to the attached drawings and the embodiment thereof.

Referring to FIGS. 1-4, a lens driving device 1 according to an embodiment of the present disclosure is shown. The lens driving device 1 may be applicable to a camera system used in an electronic device such as a digital camera, a mobile phone, a personal digital assistant, a tablet computer, a laptop computer, or the like. The lens driving device 1 includes a shell 10, a circuit board 11, a lens module 12, a supporting frame 13, an elastic member 14, a connector module 15, a driving coil 16, an anti-shake coil module 17, a position sensor module 18, a magnet assembly 19, 20 and a magnetic block member 21.

The shell 10 includes a holder 101 and a cover 102 covering the holder 101 for forming an accommodating space. The cover 102 may be made of non-magnetic material, weak magnetic material or diamagnetic material. The circuit board 11 may have a box-like structure with at least two adjacent surfaces perpendicular to each other, namely, a first surface 111 and a second surface 112, and the circuit board 11 is installed in the accommodating space of the shell 10.

The supporting frame 13 is received in the accommodating space of the shell 10. The lens module 12 is supported and received in the supporting frame 13, and may include at least one lens and a lens holder 121 for holding the at least one lens.

The driving coil 16 sleeves around the lens holder 121, and is configured for driving the lens module 12 to motion. The magnetic block member 21 may be fixed to and surround the lens holder 121, and is configured for shielding a magnetic field inside the lens driving device 1 and reducing an electromagnetic interference between the driving coil 16 and the anti-shake coil module 17.

The elastic member 14 is connected between the lens module 12 and the supporting frame 13; in particular, the elastic member 14 may include a first elastic sheet 141 adjacent to the lens module 12, and a second elastic sheet 142 adjacent to the supporting frame 13. The elastic member 14 is mainly used for restricting a motion range of the lens holder 121 so as to ensure stability of the lens holder 121 and the at least one lens therein.

Figure 5:
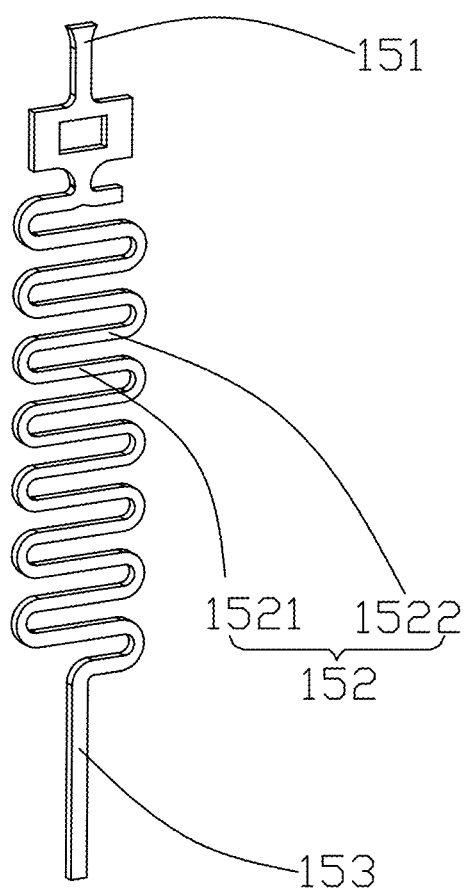
FIG. 5 is a schematic view of an elastic connecting member of the lens driving device of FIG. 1.

The connector module 15 may includes a plurality of elastic connecting members connected between the holder 101 and the supporting frame 13 in the accommodating space. Referring also to FIG. 5, each of the elastic connecting members includes a first connecting part 151 formed at an end of the elastic connecting member, a second connecting part 153 formed at an opposite end of the elastic connecting member, and an elastic part 152 connected between the first connecting part 151 and the second connecting part 153. The first connecting part 151 is further connected to the supporting frame 13, and the second connecting part 153 is further connected to the holder 101. The connector module 15 is configured for enabling the supporting frame 13 to motion along a direction perpendicular to a lens axis of the lens module 12; in the present embodiment, the lens axis refers to an axis line at a lens central and perpendicular to a lens surface. The connector module 15 may also provide buffering capability for the lens module 12 when suffering falling down or collision to improve a reliability of the lens driving module 1.

The elastic part 152 of the elastic connecting member may includes a plurality of first rods 1521 and a plurality of second rods 1522 substantially parallel to each other. The first rods 1521 and the second rods 1522 are distributed along the lens axis, and are alternately connected between the first connecting part 151 and the second connecting part 153 in a continuous S-shaped manner. The elastic part 152 may enhance stretching capability of the lens driving module 1 in the motion direction of the lens module 12, and thereby further improving the reliability of the lens driving module 1.

The anti-shake coil module 17 and the position sensor module 18 are fixed to the circuit board 11; in particular, the anti-shake coil module 17 may include at least two anti-shake coils and the position sensor module 18 may include at least two position sensors. The at least two anti-shake coils and the at least two position sensors correspond to the at least two surfaces of the circuit board 11 respectively. For example, a first anti-shake coil and a first position sensor may be fixed to the first surface 111 of the circuit board 11 and apart from each other; a second anti-shake coil and a second position sensor may be fixed to the second surface 112 of the circuit board 11 and also apart from each other; and moreover, the second anti-shake coil is close to the first anti-shake coil in relative to the first position sensor.

The magnetic assembly 19, 20 may include at least two first magnets 19 and at least two second magnets 20 fixed to the supporting frame 13. Each of the first magnets 19 may be an elongated magnet, and each second magnet 20 abuts against an end of a corresponding first magnet 19. The at least two second magnets 20 respectively disposed adjacent to the at least two position sensors, and each of the second magnets 20 corresponds to a respective position sensor.

The first magnet 19 is a two-stage plane magnetized component, which includes a first magnetized part 191 and a second magnetized part 192 in a same surface but with different magnetized directions. In the present embodiment, an area of the first magnetized part 191 is at least four times as that of the second magnetized part 192. The second magnet 20 is a single surface magnetized component abutting against the first magnetized part 191 of the first magnet 19, and has a magnetized direction opposite to that of the first magnetized part 191.

Figure 4:
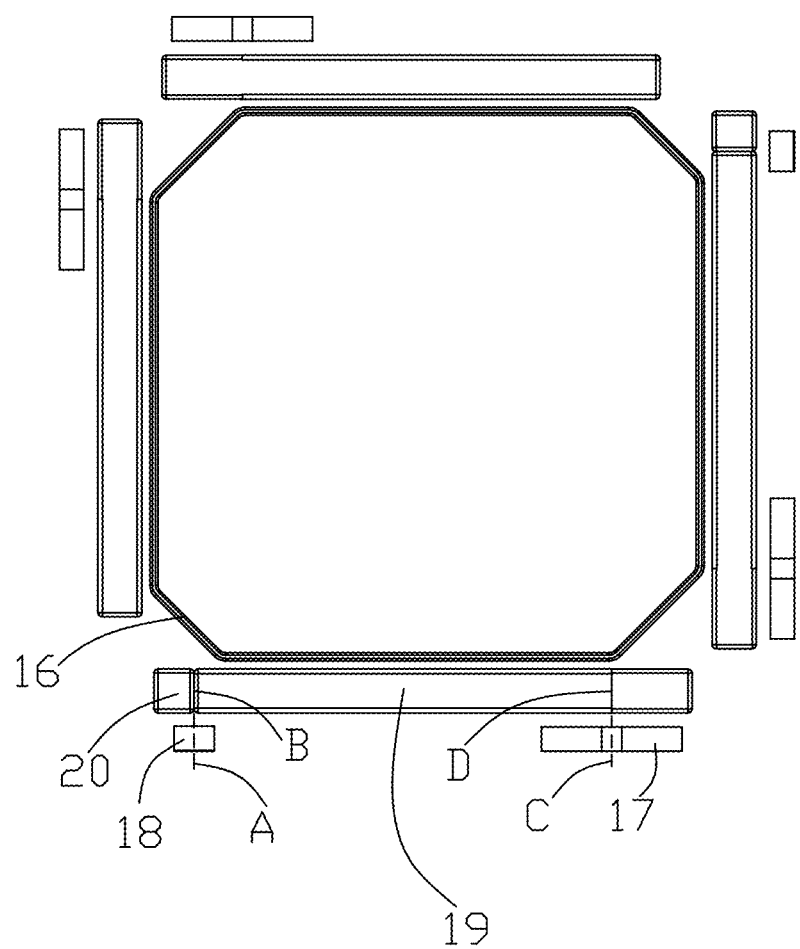
FIG. 4 is a planar, assembled view of a magnet module, a driving coil, an anti-shake coil module and a position sensor of the lens driving method of FIG. 1.

In the present embodiment, as illustrated in FIG. 4, the position sensor 18 is arranged so that a central line A thereof is located at a boundary B between the first magnetized part 191 and the second magnet 20; and moreover, the anti-shake coil 17 is arranged so that a central line C thereof is located at a boundary D between the first magnetized part 191 and the second magnetized part 192 of the first magnet 19.

It should be noted that the lens driving device 1 is not limited to the above configuration. For example, optionally, the circuit board 11 may further include a third surface parallel to the first surface 111, and a four surface parallel to the second surface 112, and the anti-shake coil module 17 may further includes two more anti-shake coils respectively fixed to the third surface and the fourth surface of the circuit board 11. The magnetic module may further include two more first magnets respectively corresponding to the two more anti-shake coils respectively on the third surface and the four surface of the circuit board 11.

In operation, the first magnet 19 provides a magnetic field to the driving coil 16, and the driving coil 16 drives the lens holder 121 to motion along the lens axis. The first magnet 19 and the second magnet 20 cooperatively provide an operation magnetic field for the position sensor module 18, and the position sensor module 18 detects position change of the first magnet 19 when the lens driving device 1 suffers shaking, and the anti-shake coil 17 enables the supporting frame 13 to motion perpendicular to the lens axis under the a magnetic effect of the first magnet 19. As such, the lens driving device 1 can realize an anti-shake capability.

In the present embodiment, since the position sensor is located apart from the anti-shake coil, the anti-shake coil has little magnetic effect on the position sensor, and thus a detecting accuracy of the position sensor can be ensured and an anti-shake performance of the lens driving device is improved.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lens driving device, comprising:
a shell providing an accommodating space;
a supporting frame accommodated in the accommodating space;
a lens module received in the supporting frame and comprising at least one lens and a lens holder for holding the at least one lens;
a circuit board accommodated in the accommodating space and comprising at least two adjacent surfaces, each of the at least two adjacent surfaces comprising a position sensor and an anti-shake coil arranged thereon and apart from each other;
a magnet assembly comprising at least two first magnets and at least two second magnets fixed to the supporting frame, each of the at least two second magnets abutting against a corresponding first magnet and be adjacent to a corresponding position sensor.

2. The lens driving device of claim 1, wherein each first magnet comprises a first magnetized part and a second magnetized part in a same surface but with different magnetized directions.

3. The lens driving device of claim 2, wherein an area of the first magnetized part is at least four times as that of the second magnetized part.

4. The lens driving device of claim 2, wherein each second magnet is a single surface magnetized component abutting against the first magnetized part of the first magnet, and has a magnetized direction opposite to that of the first magnetized part.

5. The lens driving device of claim 4, wherein a central line of the position sensor is located at a boundary between the first magnetized part and the second magnet.

6. The lens driving device of claim 5, wherein a central line of the anti-shake coil is located at a boundary between the first magnetized part and the second magnetized part of the first magnet.

\* \* \* \* \*